March 22, 1927.

W. J. COULTAS

CRANK HOLDER

Filed July 6, 1926

1,622,028

Patented Mar. 22, 1927.

1,622,028

UNITED STATES PATENT OFFICE.

WILBUR J. COULTAS, OF MOLINE, ILLINOIS, ASSIGNOR TO DEERE & COMPANY, OF MOLINE, ILLINOIS, A CORPORATION OF ILLINOIS.

CRANK HOLDER.

Application filed July 6, 1926. Serial No. 120,747.

In various mechanical structures, devices are incorporated for adjustment, or other purposes, in which a manually operated crank is employed to move the parts, and my invention relates particularly to means, which I have found desirable, to hold the crank in a normal position of disuse, my object being to provide such a device which is simple, economical and effective.

Referring to the drawings in which similar numerals indicate identical parts:

Figure 1:
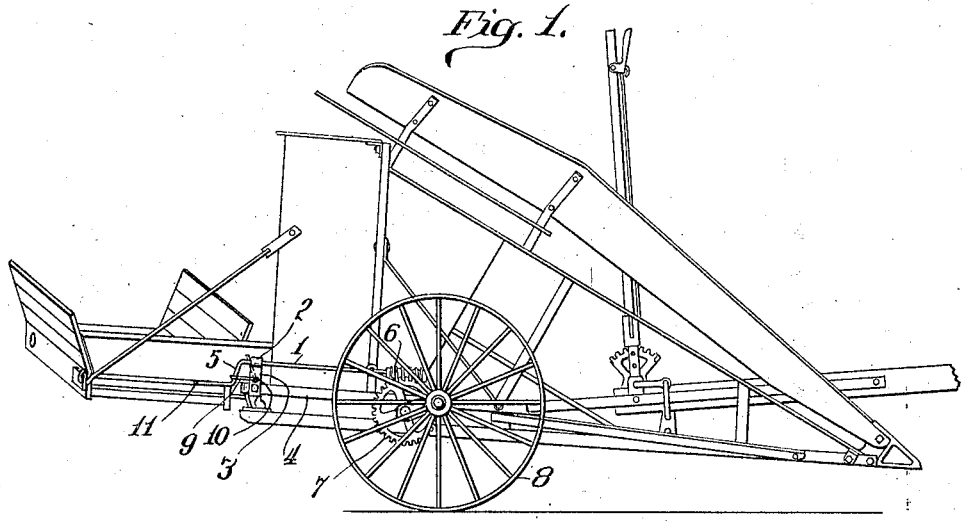
Fig. 1 is a side elevation of a corn harvester embodying my invention.

To illustrate the application and operation of my device, I have used the grain wheel adjustment of a corn harvester of a well known type, in which a shaft 1 is rotatably supported in a bearing 2 preferably integral with a bracket 3 rigidly secured on the frame 4 of the corn harvester. Rearward of the bracket 3, the shaft 1 terminates in a crank 5, the forward end of the shaft 1 being connected to a worm 6, which engages with a gear 7, the rotation of which gear, by means of the worm 6, will raise and lower the frame of the harvester relative to the wheel 8.

It is very evident the shaft 1 and worm 6 are rotatable by operation of the crank 5 to rotate the gear 7. After the desired degree of adjustment has been attained, the crank 5 is left in the position shown in Fig. 2. Due to the rough ground over which the harvester operates, it is usually the case that jolting and jarring of the harvester will act upon the gear 7 to rotate the worm 6 and lower the grain wheel side of the harvester frame, thereby affecting the level of the latter. This rotary movement of the worm 6 is very gradual, and is only betrayed by a change of position of the crank 5, which is part of the shaft 1 to which the worm 6 is connected and rotates therewith. To hold the crank 5 in its normal position of disuse, and consequently prevent rotation of the shaft 1 and the worm 6, I employ my device, which consists of a chain link 9 pivotally secured to the bracket 3, through a hole 10 therein, and embracing the crank 5 so as to rest upon the horizontal portion 11 of the crank, as shown in Fig. 2.

Figure 2:
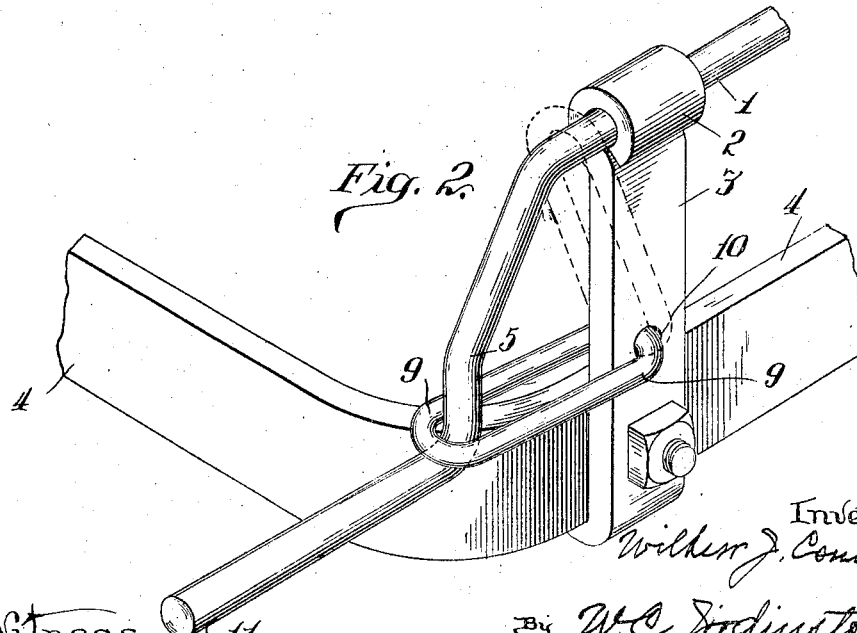
Fig. 2 is an enlarged perspective view of part of the corn harvester frame with my device mounted thereon.

It is evident that with the link in the position shown in Fig. 2, any tendency of the crank to depart from its normal position of disuse is arrested by the link 9, and the level of the harvester is consequently maintained. When it is desired to change the adjustment of the grain wheel side of the frame, the link 9 is raised, as shown in dotted lines in Fig. 2, so as to free the crank 5 for operation, and at the end of the operation, the link will drop in position, resting upon the part 11 of the crank 5.

I have shown my device on a corn harvester, but it is evident it can be employed on other machines having a similar leveling mechanism.

What I claim is:

1. In a device of the character described, the combination of a rotatable shaft, a support therefor, a crank operable to rotate the shaft, and a chain link pivotally mounted on the support normally engaging with the crank to hold the latter in a position of disuse.

2. In a device of the character described, the combination of a rotatable shaft, a support therefor, a crank at an end of the shaft operable to rotate the latter, and a chain link pivotally mounted on the support and embracing the crank and normally operating to hold the latter in a position of disuse and adapted to be swung upwardly on its pivot to free the crank for operation.

WILBUR J. COULTAS.